Oct. 13, 1959     H. R. HINDERS ET AL     2,908,409
TRACTOR OPERATED ROCK REMOVER
Filed March 22, 1957
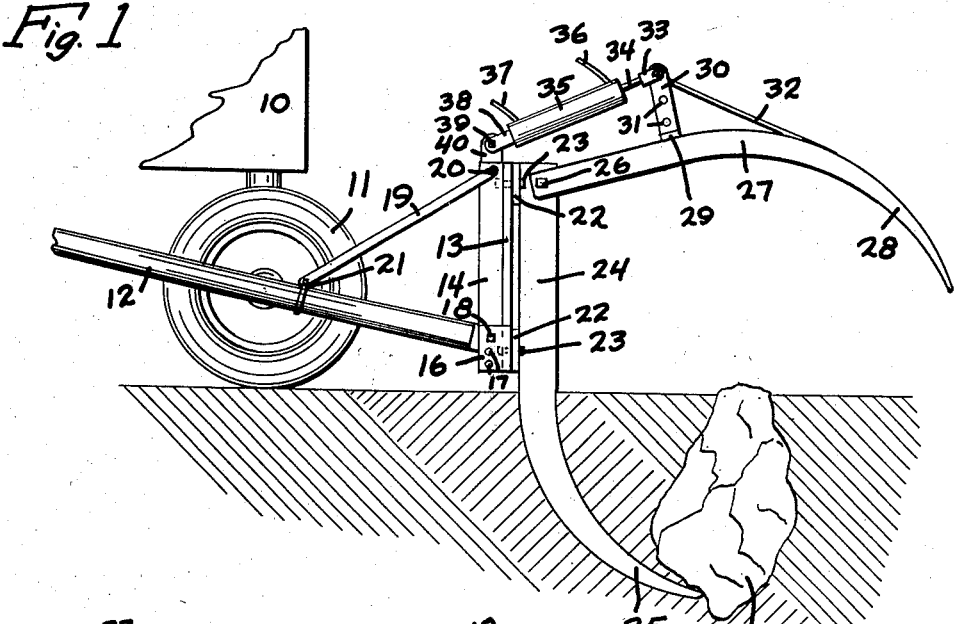
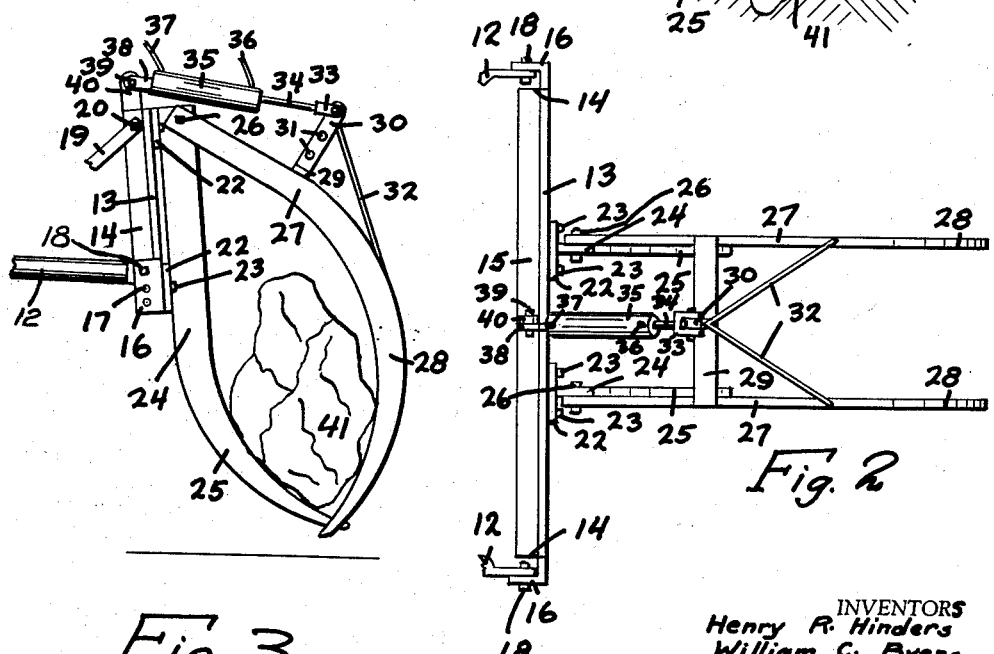
INVENTORS
Henry R. Hinders
William C. Byers
BY Everett J. Byers
Sam J. Slotsky
ATTORNEY

United States Patent Office 2,908,409
Patented Oct. 13, 1959

2,908,409

TRACTOR OPERATED ROCK REMOVER

Henry R. Hinders, Spirit Lake, and William C. Byers and Everett J. Byers, Hartley, Iowa Application March 22, 1957, Serial No. 647,814

1 Claim. (Cl. 214—147)

Our invention relates to a tractor operated rock remover.

An object of our invention is to provide a tractor operated rock remover which will efficiently force itself into the ground and will then forcibly and efficiently remove any rock which is either beneath the surface or which may extend slightly thereabove.

A further object of our invention is to provide a device of this character which can be mounted on a standard tractor hydraulic lifting arrangement.

A further object of our invention is to provide a device which, after the rock is removed, will firmly hold the rock or grasp the same, so that the rock can be carried away by the tractor, with a certain hydraulic arrangement for this purpose.

With these and other objects in view, our invention consists in the construction, arrangement, and combination of the various parts of our device, whereby the objects contemplated are attained, as hereinafter more fully set forth, pointed out in our claim, and illustrated in the accompanying drawings, in which:

Figure 1 is a side elevation of the arrangement in the rock removing position,

Figure 2 is a plan view of Figure 1, and

Figure 3 is a view similar to Figure 1 showing the manner in which the removed rock is firmly grasped to be transported.

Our invention contemplates the provision of a rock remover arrangement which can be readily attached to standard tractor parts, and which will remove the rocks by merely driving the tractor forwardly, and also includes means by which the dislodged rock will be firmly grasped to transport the rock to any desired location, whereby it can then be readily released.

The present invention pertains generally to an improvement in our patent application on a Tractor Operated Rock Remover, Serial No. 603,147, filed August 9, 1956.

We have used the character 10 to designate generally the forward portion of a tractor, the character 11 indicating the forward wheels, and we have further used the character 12 to indicate the forwardly extending side beams or pipes which are hydraulically raised or lowered and which are usually attached to a forward buck rake or other type of equipment.

The device of our invention comprises a vertically positioned flat plate 13 having the bracing members 14 and 15, and includes the flanged members 16 having the various openings 17 for adjustability, the forward end of the beams 12 being pivotally attached as at 18 through any one of these openings, and in this manner the hydraulically operated members 12 serve to raise or lower the arrangement.

The character 19 indicates a brace attached at 20 and 21. The character 22 indicates smaller plates through which pass the bolts 23, and attached to the plates 22 by welding thereto are a pair of horizontally spaced prongs 24, which terminate in the forwardly extending arcuate portions 25.

Pivotally attached at 26 to each of the prongs 24 are the grasping or jaw members 27, terminating in the arcuate portions 28, and attached across the members 27 is the flat strap 29, to which is attached the centrally positioned post 30 having the openings 31 therein for adjustable positioning of the further hydraulic unit, and attached to the post 30 and the members 27 are the bracing rods 32.

Pivotally secured through one of the openings 31 and usually the top-most opening, is a yoke 33 which is attached to a piston rod 34, which is attached to a suitable piston which reciprocates within the hydraulic cylinder 35, and communicating with the cylinder 35 are the hydraulic pipes 36 and 37 which pass to the oil pressure source of the tractor. Attached to the cylinder 35 is an ear 38 which is pivotally secured at 39 to a vertically positioned ear 40 which is attached to the bracing member 15.

The device is used in the following manner. After a rock such as 41 is located by a plow in the field, or by being partially visible, or after several of the rocks have been located, the arrangement is bolted to the arms 12 as has been explained, with the lower points of the arcuate portions 25 resting upon the upper ground level at a slight distance from the rock location. In this position the device will be as shown in Figure 1 with the jaws 27 being upward. Next, the tractor is driven forwardly and the curvature of the portions 25 will automatically cause these portions to force themselves downwardly into the ground and behind the rock 41 as shown in Figure 1, whereby continued movement of the tractor forwardly will force the rock upwardly and out of the ground, and at the same time the arms 12 will be hydraulically lifted, and as a result the rock will pass upwardly.

After the rock has been lifted upwardly, oil is forced through the pipe 37 which will cause the piston rod 34 to expand as shown in Figure 3 to thereby force the jaws 27 and portions 28 toward the rock, and by proper manipulation we have found that the rock will be efficiently grasped and held as shown in Figure 3, and thence by driving the tractor to any location desired, the rock can be carried to such location and deposited.

When it is desired to deposit the rock, the oil pressure is forced through the pipe 36 which causes the rod 34 to retract, thereby opening the jaws 27.

It will thus be noted that the device fulfills the objects of our invention and includes further advantages readily apparent.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

A tractor operated rock remover comprising a pair of tractor operated pivoted booms, a framework rigidly attached to said booms, a pair of horizontally spaced vertically positioned rock removing prongs fixedly attached to said framework, said prongs including lower arcuate portions having forwardly extending points, said arcuate portions extending substantially beneath said framework and being curved forwardly, a pair of curved jaws pivotally secured to the upper ends of said prongs and positioned outwardly thereof, means for urging said jaws toward said prongs to secure a dislodged rock between said prongs and said jaws, a transverse strap attached between said jaws, a post attached to said transverse strap, a piston rod pivotally secured to said post, a piston attached to said piston rod, a hydraulic cylinder receiving said piston, means for forcing an oil supply into said cylinder to force said piston rod outwardly to close said jaws, said hydraulic cylinder being pivotally secured at the top of said framework, said post having a plurality of openings for permitting selective pivotal attachment of said piston rod to said post.

References Cited in the file of this patent

UNITED STATES PATENTS

| | | |
|---|---|---|
| 2,745,565 | Johnson | May 15, 1956 |
| 2,783,904 | Oman | Mar. 5, 1957 |
| 2,804,221 | Kennedy | Aug. 27, 1957 |